US010649882B2

(12) United States Patent
Li et al.

(10) Patent No.: US 10,649,882 B2
(45) Date of Patent: May 12, 2020

(54) AUTOMATED LOG ANALYSIS AND PROBLEM SOLVING USING INTELLIGENT OPERATION AND DEEP LEARNING

(71) Applicant: FMR LLC, Boston, MA (US)

(72) Inventors: Pu Li, Liaoning (CN); Maohua Sun, Liaoning (CN); Hua Hao, Dalian (CN); Junmei Liu, Liaoning (CN); Yuanjun Liu, Liaoning (CN); Yucai Yang, Liaoning (CN)

(73) Assignee: FMR LLC, Boston, MA (US)

( * ) Notice: Subject to any disclaimer, the term of this patent is extended or adjusted under 35 U.S.C. 154(b) by 122 days.

(21) Appl. No.: 15/689,559

(22) Filed: Aug. 29, 2017

(65) Prior Publication Data

US 2019/0065343 A1 Feb. 28, 2019

(51) Int. Cl.
*G06F 11/36* (2006.01)
*G06N 3/04* (2006.01)
*G06N 3/08* (2006.01)
*G06F 11/00* (2006.01)

(52) U.S. Cl.
CPC ........ *G06F 11/3608* (2013.01); *G06F 11/008* (2013.01); *G06N 3/0445* (2013.01); *G06N 3/08* (2013.01)

(58) Field of Classification Search
CPC ... G06F 11/3608; G06F 11/36; G06N 3/0445; G06N 3/08
USPC .................................. 714/26, 38.1; 717/125
See application file for complete search history.

(56) References Cited

U.S. PATENT DOCUMENTS

| 5,463,768 A | 10/1995 | Cuddihy |
| 6,513,025 B1* | 1/2003 | Rosen .................... G06N 5/025 706/45 |
| 7,500,142 B1* | 3/2009 | Cowart ................. H04L 41/065 702/183 |
| 8,589,428 B2 | 11/2013 | Smith et al. |
| 8,832,125 B2 | 9/2014 | Boctor |
| 2002/0107858 A1* | 8/2002 | Lundahl ............... G06K 9/6218 |

(Continued)

OTHER PUBLICATIONS

Han, Jiawei et al., "Mining Frequent Patterns by Pattern-Growth: Methodology and Implications", Dec. 2000, ACM SIGKDD Explorations, vol. 2, Issue 2, pp. 14-20.*

(Continued)

*Primary Examiner* — Matthew M Kim
*Assistant Examiner* — Indranil Chowdhury
(74) *Attorney, Agent, or Firm* — Proskauer Rose LLP

(57) ABSTRACT

A computer-implemented method of training, using a computer log file, an application error prediction engine to identify one or more application errors includes parsing the computer log file into a plurality of data sets. Each data set is associated with a unique computing session having a session identifier and ending in an application or. The method also includes extracting, from each data set, values for a specified set of parameters in each data set. The method also includes encoding the extracted values for each data set into a corresponding data structure. The method also includes generating, for each data structure, a corresponding vector, the corresponding vectors collectively forming a matrix. The method also includes calculating, based on the matrix, a set of clusters, each cluster corresponding to a known error type, the set of clusters used to create a model used to identify new error types.

27 Claims, 12 Drawing Sheets

(56) References Cited

U.S. PATENT DOCUMENTS

| | | | | |
|---|---|---|---|---|
| 2006/0161814 A1* | 7/2006 | Wocke | .................. | G06K 9/6251 |
| | | | | 714/26 |
| 2011/0083123 A1 | 4/2011 | Lou et al. | | |
| 2011/0185234 A1* | 7/2011 | Cohen | .................. | G06F 11/3476 |
| | | | | 714/37 |
| 2012/0233104 A1* | 9/2012 | Wang | .................. | G06N 3/0427 |
| | | | | 706/21 |

OTHER PUBLICATIONS

Zhao, Bendong et al., "Convolutional Neural Networks for Time Series Classification", Feb. 2017, Journal of Systems Engineering and Electronics, vol. 28, No. 1, pp. 162-169.*

Colah, "Understanding LSTM Networks", Aug. 2015, http://colah.github.io/,pp. 1-16.*

Yliopisto, Oulun, "Iterative Root Cause Analysis Using Data Mining in Software Testing Processes", Mar. 6, 2016, University of Oulu, Faculty of Information Tech. and Electrical Engineering, Master's Thesis, pp. 1-70.*

\* cited by examiner

AUTOMATED LOG ANALYSIS AND PROBLEM SOLVING USING INTELLIGENT OPERATION AND DEEP LEARNING

TECHNICAL FIELD

This application relates generally to systems, methods and apparatuses, including computer programs, for analyzing computer log files, diagnosing system errors and implementing repair solutions. More specifically, this application relates to applying deep learning and intelligent operation methods to enhance error identification, diagnosis and repair in computer systems.

BACKGROUND

Log data is fundamental to the operation of enterprise applications, including for error monitoring, troubleshooting, and maintaining security. Most computer logs are not designed or intended to be analyzed directly by humans, as the extreme volumes, velocities and varieties of log data can quickly overwhelm human cognition. Although manual and automated testing can be used to identify some errors and potential faults, these methods cannot pick up the wide range and volume of potential issues that may arise.

Currently, manual log analysis plays an important role in resolving issues that cannot be found by testing. Simple log analysis tools (e.g., Splunk) exist to help humans follow event chains, filter data and try to determine the root cause of a complex issue. However, such analysis requires much expert knowledge and can be costly and time-consuming, particularly to perform a manual log analysis on massive amounts of log data. The difficulty can be compounded for systems that are frequently updated with a variety of techniques and domains of knowledge.

No engineer can become familiar with every detail of system operation and foresee all of the potential errors that may arise, and it can be even harder to trace the root cause of the errors. In addition, it can be quite difficult to fix an identified issue promptly after identifying the root cause, as organizations often have limited resources to provide the level of experienced engineers required to address these issues on a 24/7 basis.

SUMMARY

Accordingly, there is a need for improved systems, methods and apparatuses to provide a more effective and efficient means to predict problems before they become critical issues and to trace root causes of errors. In particular, deep learning methods and intelligent operations algorithms can be harnessed to predict errors from log files in a testing environment, to help developers fix errors before they go to production, to make the computer learn how to identify root causes of identified errors, and to fix errors automatically to avoid delays to solutions.

One innovation in this invention is to parse computer log data according to a user's session identification. Traditional methods simply extract errors and do not recognize or exploit the relationships between errors. But generally, errors are not isolated—rather, they are caused by other errors and warnings and perhaps lead to even further errors. These relationships can be found by analyzing each session's series of actions. A dictionary of words (e.g., including errors and warnings) can be built using the frequency with which words appear, with only relatively important (e.g., frequent) words added to the dictionary. In addition, further information from warnings within a session can be added to provide context, e.g., to tune the weights of words so that important information will not be missed and redundant information can be discarded.

Some or all of this log information can be represented in a matrix, which combines together the log entries in the same session. Traditional methods simply consider one error log entry as a single input vector, but that approach neglects important hidden information, because most of the errors are related by the sequence of the actions culminating in an error, not just one single action. In this sense, a matrix is a more powerful tool than a single input vector to represent the session information. Then, adding context information and tuning can lead each dimension of the matrix to represent the session more succinctly and accurately.

Another innovation is to use a statistical pooling algorithm, after the session matrix is generated, to transform the matrix into a vector. Unlike the single input vector of traditional methods, pooling can capture significant, higher level abstract information of each dimension of a matrix and represent it in a single vector. This creates a new frame for log analysis, in which new error types can be detected, together with the higher-level categories into which they fall. Finally, by utilizing Association Rules Analysis and Recursive Neural Networks, the present invention can identify root causes of errors from log analysis and can predict errors ahead of their occurring to avoid major issues and to help devise solutions, which in some cases can be implemented automatically.

In one aspect, the invention features a computer-implemented method of training, using a computer log file, an application error prediction engine to identify one or more application errors. The method includes parsing the computer log file into a plurality of data sets. Each data set is associated with a unique computing session having a session identifier and ending in an application error. The method also includes extracting, from each data set, values for a specified set of parameters in each data set. The method also includes encoding the extracted values for each data set into a corresponding data structure, the data structure including numerical entries representing the extracted values. The method also includes generating, for each data structure, a corresponding vector, the corresponding vectors collectively forming a matrix. The method also includes calculating, based on the matrix, a set of clusters, each cluster corresponding to a known error type. The method also includes integrating the set of clusters into the application error prediction engine to create a model used to identify new error types. In some embodiments, each of these steps, or other steps described herein, can be performed on a computing system by a data processor, e.g., a data processor included in the computing system in which the computer log file is stored.

In some embodiments, generating the corresponding vectors includes using a statistical pooling method. In some embodiments, the statistical pooling method includes one of mean-pooling, max-pooling or stochastic-pooling. In some embodiments, generating the corresponding vectors further includes using a principal component analysis method. In some embodiments, calculating the set of clusters includes utilizing an artificial neural network. In some embodiments, the artificial neural network is a self-organizing feature map. In some embodiments, the specified set of parameters corresponds to a set of features from individual log entries in the computer log file. In some embodiments, the set of features includes a session identifier, a severity, a message, a request URI or a POE value of the computer log file.

In some embodiments, each data set in the plurality of data sets includes a j×l matrix representing a session, the session including j actions, each action containing l extracted features. In some embodiments, generating the corresponding vectors includes using a statistical pooling method to convert the j×l matrix into an l-dimensional vector. In some embodiments, the method further includes encoding each of the extracted features in the l-dimensional vector as a number. In some embodiments, the method further includes normalizing the l-dimensional vector. In some embodiments, the data structure includes information encoding at least one warning message and at least one error message. In some embodiments, the data structure includes context information from the computer log file related to a warning message.

In some embodiments, a quantity of clusters calculated corresponds to a quantity of unique error types. In some embodiments, the method also includes determining a new error type that is different from each of the unique error types corresponding to the calculated clusters. In some embodiments, the method also includes determining a category of the new error type. In some embodiments, determining the category of the new error type includes training a long short-term memory model. In some embodiments, determining the category of the new error type includes stacking multiple layers of long short-term memory models, an input of a second layer provided by an output of a first layer, and an input of a subsequent layer provided by an output of an immediately preceding layer. In some embodiments, the method further includes determining a root cause of the new error type using a frequent pattern tree algorithm. In some embodiments, the method further includes predicting an occurrence of a future error. In some embodiments, the method further includes taking a preemptive or remedial action to address the future error.

In another aspect, the invention features a computer-implemented method of identifying one or more application errors in a live computing session using a computer log file. The method includes loading into memory an error prediction engine, the error prediction engine including data clusters calculated based on historic computer log data, each cluster corresponding to a known error type. The method also includes monitoring, using the error prediction engine, the computer log file for live input including application error and warning information. The method also includes cross-referencing, using the error prediction engine, the live input with the data clusters stored in memory to predict whether a new error type may occur. The method also includes generating, for each new error type that may occur, a corresponding warning message displayed during the live computing session. In some embodiments, the method includes determining a category of the new error type. In some embodiments, determining the category of the new error type includes using a long short-term memory model. In some embodiments, determining a root cause of the new error type using a frequent pattern tree algorithm.

In another aspect, the invention features a computer-implemented method of determining, based on a computer log file, a root cause of at least one error. The method includes extracting from the computer log file a number of data sets, each data set associated with a unique session having a session identifier and including at least one error and at least one action. The method also includes processing each data set to generate a corresponding set of ordered frequent items. The method also includes processing each set of ordered frequent items to generate a corresponding frequent pattern tree. The frequent pattern tree is generated by: generating, for each unique error, a conditional pattern base of the unique error; and generating, based on each conditional pattern base, a conditional frequent pattern tree for each unique error. The method also includes determining, based on each frequent pattern tree, a frequent set of actions associated with each unique error. The method also includes determining, based on each frequent set of actions associated with the error, the root cause of each error. In some embodiments, the method includes identifying a solution associated with at least one error. In some embodiments, the method includes implementing the solution automatically or triggering a fixing process to implement the solution.

In another aspect, the invention features a computer-implemented method of training an error prediction model based on historic computer log data. The method includes processing the historic computer log data to generate data subsets, each data subset corresponding to a unique session having a first number of actions, each action having a second number of features. The method also includes, for each session ending in an error: (1) extracting from each action a set of features; (2) processing each set of features into a set of corresponding numerical components; (3) generating, for each set of numerical components, a normalized vector; and (4) grouping the normalized vectors into a session matrix. The method also includes applying to each session matrix a statistical pooling method, thereby generating a corresponding set of session vectors. The method also includes calculating, based on the set of session vectors, a set of clusters, each cluster corresponding to a unique error type. In some embodiments, the method further includes defining a labeling function configured to generate an output for each session ending in a new error type. In some embodiments, the method further includes training, using the labeling function, a long short-term memory architecture comprising a net of long short-term memory layers, wherein an output of one layer includes an input of a subsequent layer. In some embodiments, the method further includes determining a category of the new error type based on a scope of the output of the labeling function.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis is instead generally placed upon illustrating the principles of the invention.

DETAILED DESCRIPTION

Figure 1:
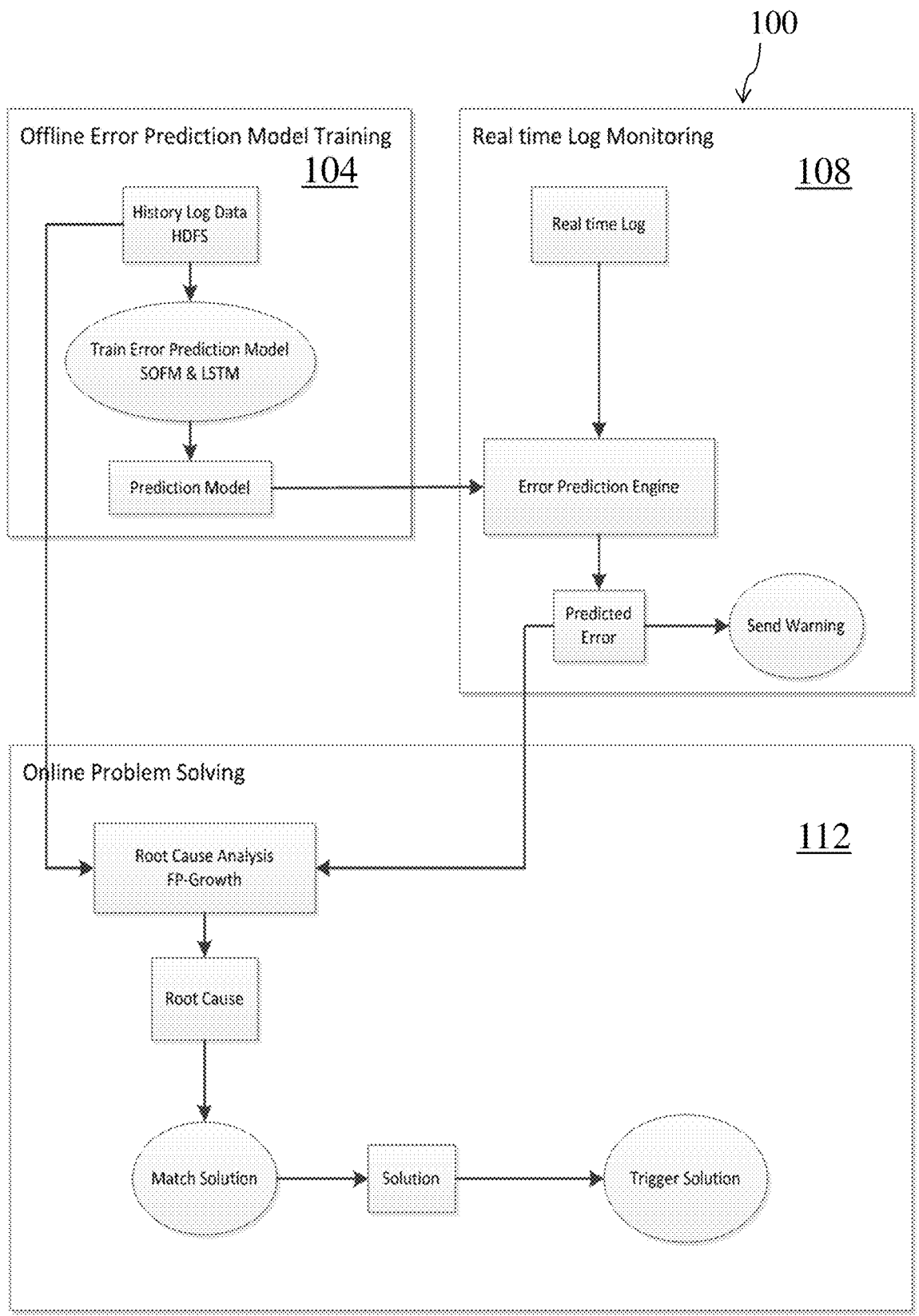
FIG. 1 shows a high level schematic workflow diagram of computer-implemented modules for training an application error prediction engine, monitoring a computer system for errors, and diagnosing and remedying errors, according to an illustrative embodiment of the invention.

FIG. 1 shows a high level schematic workflow diagram 100 of computer-implemented modules for training an application error prediction engine, monitoring a computer system for errors, and diagnosing and remedying errors, according to an illustrative embodiment of the invention. The diagram 100 includes three basic computer-implemented modules: (1) an Offline Error Prediction Model Training Module (Training Module) 104; (2) a Real Time Log Monitoring Module (Monitoring Module) 108; and (3) an Online Problem Solving Module (Solution Module) 112. In the Training Module 104, historic computer log data are used to train an error Prediction Model, which can be utilized by the Monitoring Module 108 and the Solution Module 112. In the Monitoring Module 108, an Error Prediction Engine analyzes a Real Time Log for errors and uncovers one or more Predicted Errors. Uncovering a Predicted Error prompts the module to send a warning to the user. In the Solution Module 112, an Association Rules Analysis is utilized to backtrack within a computer log to find the root cause of an error. In some embodiments, the Solution Module 112 includes the step of matching a solution with a root cause of the error. In some embodiments, the solution is automatically implemented. In some embodiments, a human team is prompted to implement the solution manually. The purpose and functionality of each of the three basic modules is described in greater detail below.

Offline Error Prediction Model Training (Training Module 104)

The Training Module 104 uses two basic deep-learning models: (a) a Self-Organized Feature Map (SOFM), which is employed for detection of new errors; and (b) a Long Short Term Memory (LSTM) model, which is employed for prediction of the higher-level error category. A SOFM is a type of artificial neural network (ANN) in which complex, high-dimensional data are projected into a lower space, such that the most important topological and metric relationships of the primary data are preserved. SOFM is a clustering method, and its computation is a nonparametric recursive regression process. LSTM is a branch of recurrent neural networks (RNN). A neural network includes three primary parts: the input layer, the hidden layer, and the output layer. LSTM adds input, output and forget gates to the conventional neural network, and these three gates capture activations from inside and outside the memory block, which preserves the net influence of a given input on the hidden layer. The methodology employed by the Training Module 104 is shown in greater detail in FIG. 2.

Figure 2:
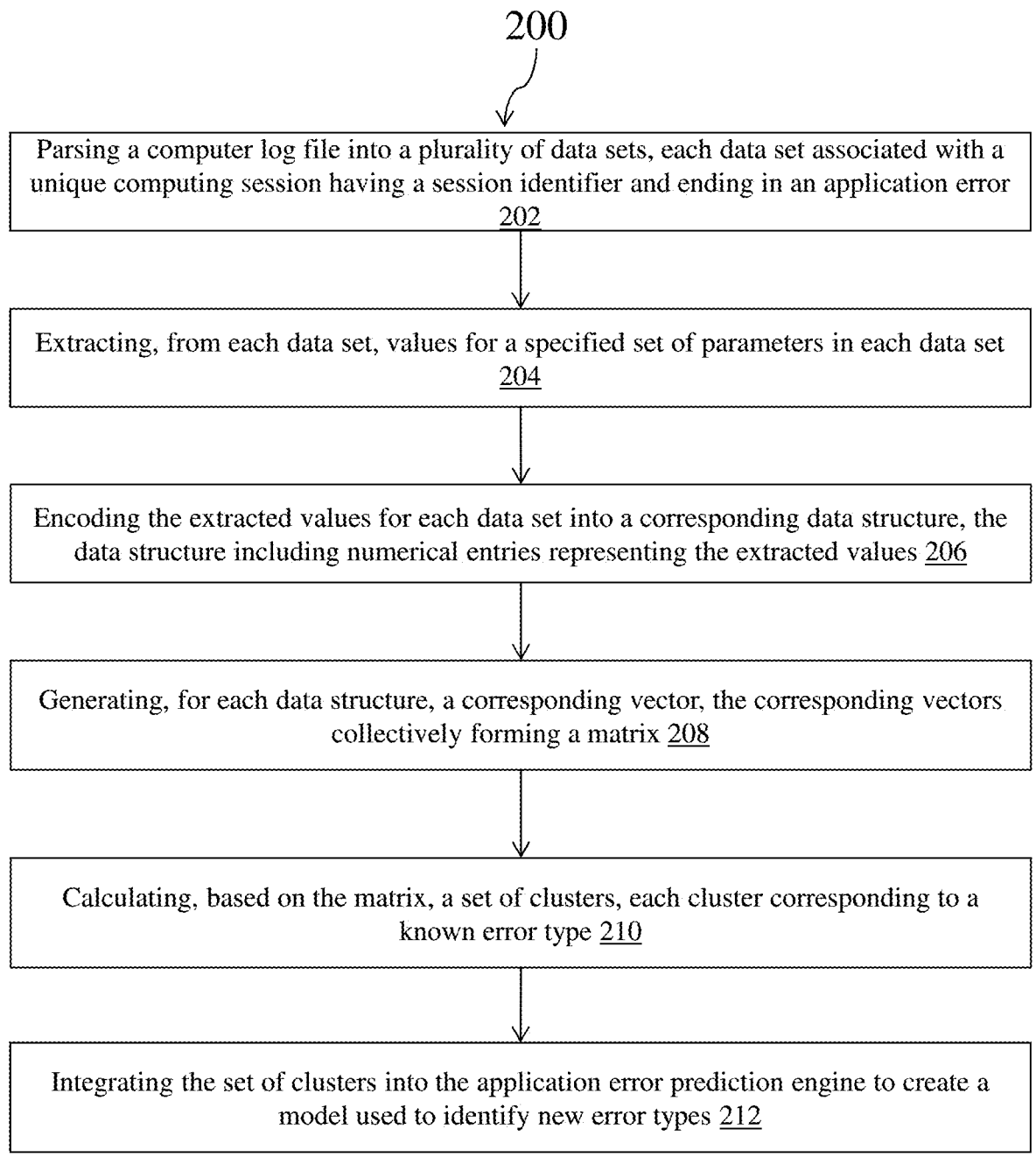
FIG. 2 shows a flowchart of a computer-implemented method for training an application error prediction engine to identify one or more application errors and detect new error types, according to an illustrative embodiment of the invention.

FIG. 2 shows a flowchart 200 of a computer-implemented method for training an application error prediction engine to identify one or more application errors and detect new error types, according to an illustrative embodiment of the invention. In some embodiments, each of the below steps is performed on a computing system by a data processor, e.g., the computing system in which the computer log file is stored. In a first step 202, the computer log file is parsed into a plurality of data sets, each data set associated with a unique computing session having a session identifier and ending in an application error. In a second step 204, values for a specified set of parameters in each data set are extracted from each data set. In a third step 206, the extracted values for each data set are encoded into a corresponding data structure, the data structure including numerical entries representing the extracted values. In a fourth step 208, for each data structure, a corresponding vector is generated, the corresponding vectors collectively forming a matrix. In a fifth step 210, a set of clusters is calculated based on the matrix, each cluster corresponding to a known error type. In a sixth step 212, the set of clusters is integrated into the application error prediction engine to create a model used to identify new error types. The application error prediction engine can be stored in memory, e.g., permanent memory of the computing system.

A more detailed example can help to illustrate one or more of the above steps. In this example, historic log data (e.g., in a raw log file) are first pre-processed so a large amount of raw data can be efficiently handled. The raw log data are converted to vectors, and these data are parsed according to the user's session (e.g., using a session file), with the actions within each session eventually combined as one sample used to train the error prediction model. Let $S=\{S_1, S_2, \ldots, S_i\}$ be a set of sessions, in which each $S_i=\{a_1, a_2, \ldots, a_j\}$ is the sequence of actions within a session. Only the sessions that end with an error are considered as a sample to the training data set. Each $a_i=\{f_1, f_2, \ldots, f_i\}$ represents the extracted features from each action, and the features are extracted from a single log entry. Eventually, the actions within one session will be combined together as a matrix including warning and error information from that session.

An example of one line from the raw log file is:

---

2016/07/05 01:44:23:378 [Severity=WARN] message=data GET: subjectArea: workplaceplandata {ThreadId=dataControllerTaskExecutor-3|AppId=AP106564|TrackingId=REQ577971b40a235b2920000efc0002aa33| MID=eebd9931f2750011d688b9ac196951aa77|ACTFORMID= |ACTFORSID=|PUREPROSPECTID=|RepId=|RequestUri=/ftgw/tools/customer/data/datacompleteinfo/get.go|FsSessionId= 577971490a235b0720006f150001aa330000|SessionId= 80C68A50B93D8226C9A1FDEDC86782F1|SID=bd9931b6-7500-11d6-88b9-ac196951aa77|MIMEDMID=|UserMid=|RepMid=|POE=RETAIL}

---

In this example, the extracted features will be the set: {SessionId, Severity, message, RequestUri, POE} and the extracted values will be: {80C68A50B93D8226C9A1FDEDC86782F1, WARN, workplaceplandata, /ftgw/tools/customer/data/datacompleteinfo/get.go, RETAIL}. These feature values are then encoded to numbers (e.g., using a one hot encoder), so that the single log entry will be converted to a vector (e.g., [0, 1, 3, 2, 0]). Then, a normalization method is used to normalize the features, e.g. use $$\frac{x_i}{x_{max} - x_i}$$

to normalize the numbers to the range [0, 1], creating a normalized vector (e.g., [0, 0.3, 0.6, 0.5, 0]).

If there is an error, then the log entry vectors are grouped by SessionId, resulting in a j×l matrix for a session containing j actions, in which each action contains l features. An example matrix is:

$$\begin{bmatrix} 0 & 0.3 & 0.6 & 0.5 & 0 \\ 0 & 0.6 & 0.3 & 0 & 1 \\ 0 & 1 & 0 & 1 & 0 \end{bmatrix}$$

After the features are extracted and the actions belonging to the same session are combined, a clustering model is built based on the existing errors. In one embodiment, a Google TensorFlow deep learning platform is used to build a SOFM model for clustering the errors (e.g., if the existing errors have 10 different Error Codes, then the data are arranged in 10 clusters). The model can automatically determine the pattern for each cluster. Then, during the real time log monitoring phase (described below), the SOFM model can detect new errors that are not inside of the existing 10 clusters.

Following the discussion above, each session $S_i$ is represented by a matrix: $S_i = \{s_{j,l}\}_{j \times L}$, where $s_{j,l}$ is the (j, l)-th component of the matrix. Before using SOFM to cluster the errors, this matrix can be converted to an l-dimensional vector by using a statistical pooling method. Pooling is widely used in image recognition tasks, as it simulates a human's vision system to represent the image with high-level abstracted information. Generally, there are three popular pooling methods in image tasks: mean-pooling, max-pooling and stochastic-pooling. Each row of the matrix contains statistical information, and these three pooling methods try to capture the different statistics in different ways. For example, mean-pooling tries to capture the mean statistics of each dimension, which can be calculated as:

$$S_i = \left( \frac{\sum_{j=1}^{J} s_{j,l}}{J} \right)_{l=1,\ldots,L}.$$

Applying this method to the matrix above, the vector [0, 0.63, 0.3, 0.5, 0.33] is obtained. In contrast, max-pooling captures the strongest activation (maximum) in each dimension: $S_i = \{\max_{j \leq J} s_{j,l}\}_{l=1,\ldots,L}$. Applying this method to the matrix above, the vector [0, 1, 0.6, 1, 1] is obtained.

Finally, stochastic-pooling carries the advantage of capturing the higher probability components in one dimension. The additional components in the same dimension can be taken into account, and stochastic-pooling ensures that these non-maximal components are also utilized. Applying this method to the matrix above, first calculate the column-sum of each dimension: [0, 1.9, 0.9, 1.5, 1], and then get the probability of each component by column:

$$p_{j,l} = \frac{s_{j,l}}{\sum_{j=1}^{J} s_{j,l}}$$

Then get the probability matrix:

$$\begin{bmatrix} 0.33 & 0.16 & 0.67 & 0.33 & 0 \\ 0.33 & 0.31 & 0.33 & 0 & 1 \\ 0.33 & 0.53 & 0 & 0.67 & 0 \end{bmatrix}$$

Next, sort the probabilities by column and obtain:

$$\begin{bmatrix} 0 & 0 & 2 & 1 & 0 \\ 1 & 1 & 1 & 0 & 2 \\ 2 & 2 & 0 & 2 & 1 \end{bmatrix}$$

For the l-th column, randomly choose a number $n_l \in [0,2]$, where n=[1,0,1,2,1]. Then, the matrix above, after stochastic-pooling, is represented by the following vector:

[0,0.3,0.3,1,0]

Taking the 5-th column of the matrix as an example, 0 appears 2 times, which means that if 0 or 1 is randomly generated, then 0 will always be selected. In other words, stochastic-pooling prefers selecting the component that has the higher probability.

After pooling, each session is represented by a vector, and all the sessions can be represented by a matrix: $S = \{x_1, \ldots x_p, \ldots, x_p\}_{p=1,\ldots,P}$. This matrix can be fed to the SOFM for clustering. As an example, take $$S = \begin{bmatrix} 0 & 0.6 & 0.2 & 1 & 025 \\ 0.5 & 0.4 & 0.1 & 0 & 0.8 \\ 0.1 & 0 & 0.125 & 0.6 & 0 \end{bmatrix}.$$

These three vectors can be fed into the SOFM to calculate the clusters, according to the following steps.

Let m be the number of clusters. In this example, set m=2. Then, randomly initialize the weight vectors and normalize to get the initial winners:

$N_j{-}(0) = \{\hat{w}_1, \hat{w}_2\}$ $\hat{w}_1(0) = [1,0,0,0,0]$ $\hat{w}_2(0) = [0,0,0,0,1]$ Initialize the learning rate: $\eta(t) = e^{-t}$.
Normalize the input vectors and obtain:

$\hat{x}_1 = [0, 0.50, 0.17, 0.83, 0.21]$ $\hat{x}_2 = [0.49, 0.39, 0.10, 0, 0.78]$ $\hat{x}_3 = [0.16, 0, 0.20, 0.97, 0]$ For $\hat{x}_1$:

$D(\hat{w}_1(0), \hat{x}_1) = \|\hat{x}_1 - \hat{w}_1(0)\|^2 = 1.42$ $$D(\hat{w}_2(0),\hat{x}_1)=\|\hat{x}_1-\hat{w}_2(0)\|^2=1.26$$

$$D(\hat{w}_1(0),\hat{x}_1)>D(\hat{w}_2(0),\hat{x}_1)$$

As $\hat{w}_2(0)$ is the nearest to $\hat{x}_1$, then $\hat{w}_2(0)$ is the winner.

Define the neighbors of the winner as 1 when t=0 and 0 when t>0.

Let $\sigma(t)=1$ and update the winner weight vector: $\hat{w}_2(0)$ $$h_{12}(0)=e^{-0}\exp(-0/2)=1$$

$$\hat{w}_2(1)=\hat{w}_2(0)+h_{12}(t)(\hat{x}_1-\hat{w}_2(0))=[0.00,0.50,0.17,0.83,0.21]$$

and neighbors of $\hat{w}_2(0)$: $\hat{w}_1(0)$ $$h_{11}(0)=e^{-0}\exp(-1/2)=0.61$$

$$\hat{w}_1(1)=\hat{w}_1(0)+h_{11}(0)(\hat{x}_1-\hat{w}_1(0))=[0.39,0.31,0.10,0.51,0.13]$$

Let $\varepsilon=1e-3$; as $\eta(0)=e^{-0}=1>\varepsilon$; return to step 2 for another input vector and let t=t+1. Stop the circulation until $\eta(t)>\varepsilon$. Then, with the set of clusters calculated, the clusters are integrated into the application error prediction engine to create a model used to identify new error types, as set forth below.

The next step is to build an error category prediction model, which can be used to predict the error category of the new error. Note that an "error category" is different from an "error type." An error type includes detailed information about existing known errors (which may have been fixed in later versions of a software application). These error types are used as baseline to detect new errors. In contrast, an "error category" is a high level concept that represents the common category into which each error type falls. For example, the error category could be "time out", "connection reset", "JSON exception", and/or "null pointer".

Figure 3A:
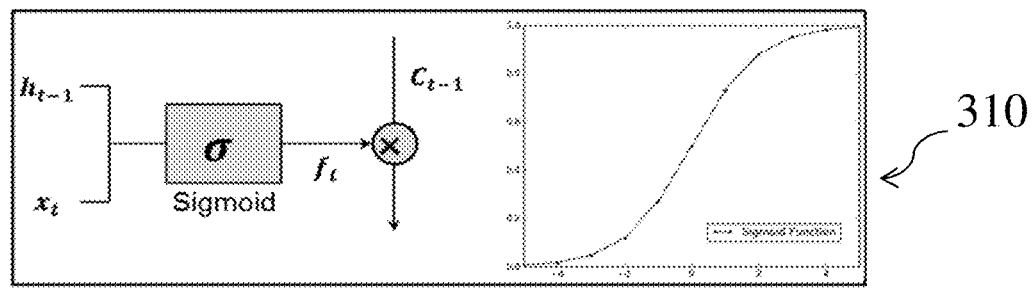
FIGS. 3A-3C illustrate method steps used to train a LSTM model used in error category prediction, according to an illustrative embodiment of the invention.
Figure 3B:
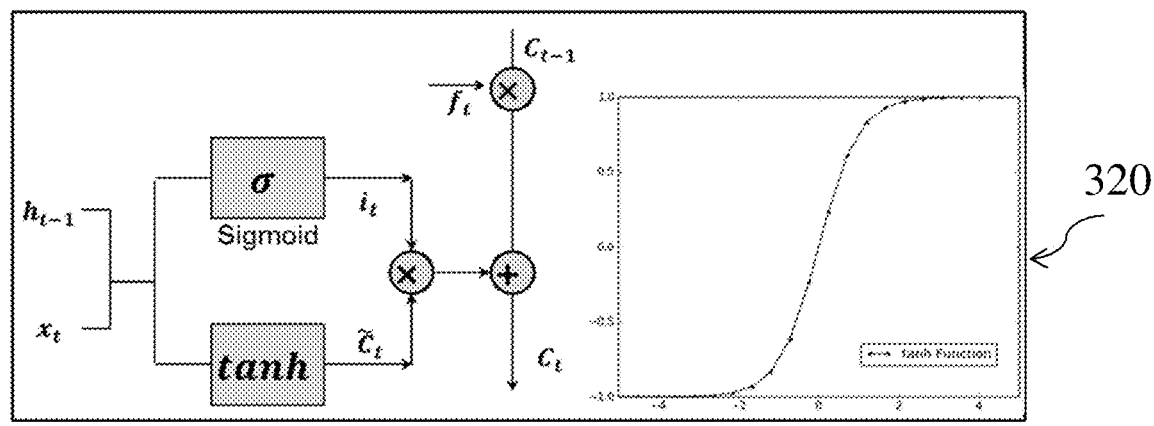
Figure 3C:
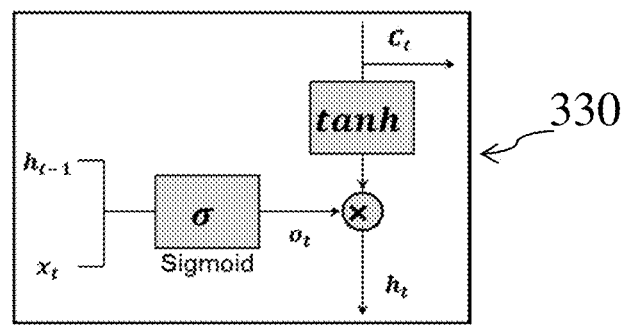

To build the error category prediction model, the first step is to label the corpus. Define a labeling function $f(S_i)$ to automatically label each session. The scope of $f(S_i)$'s results are the error category set. Then, TensorFlow is used to train a LSTM model for the error category prediction. FIGS. 3A-3C illustrate method steps used to train a LSTM model used in error category prediction, according to an illustrative embodiment of the invention. FIG. 3A illustrates the first step 310, which is to discard information from the cell. The forget gate determines which information will be discarded from the cell. As shown in FIG. 3A, the input of the gate is the concatenation of $x_t$ and $h_{t-1}$, and this new combined vector will be fed to the sigmoid function $\sigma$. Then the output, $f_t=\sigma(W_f\cdot[h_{t-1},x_c]+b_f)$, becomes a vector with elements between 0 and 1, and will multiply with the former state of the cell, $C_{t-1}$. As 0 means discarding and 1 means keeping, this process can determine which information of the former state will be remembered and which will be forgotten.

FIG. 3B illustrates the second step 320, which is to update the information in the cell. This second step controls what information will be kept. First, the input gate determines what information should be updated through the sigmoid function: $i_t=\sigma(W_t\cdot[h_{t-1},x_t]+b_i)$. Then, a tan h function is used to generate new information: $\tilde{C}_t=\tan h(W_C\cdot[h_{t-1},x_t]+b_C)$. In natural language analysis, these steps mean that new words will be added to the cell to replace the words that should be forgotten. Finally, the results of the first step, $f_t$, and the results of this step, $i_t$ and $\tilde{C}_t$, will be used to update the state of the cell: $C_t=f_t*C_{t-1}+i_t*\tilde{C}_t$.

FIG. 3C illustrates the third step 330, which is to determine the final output. The outputs of the block are determined by the cell state, $C_t$; the former output, $h_{t-1}$; and the input, $x_t$. First, the state of cell will be modified by the tan h function, and a sigmoid function will choose which and how much of the information should be outputted: $o_t=\sigma(W_o\cdot[h_{t-1},x_t]-b_o)$. Then, the output of the block is the multiplication of these two parts: $h_t=o_t*\tan h(C_t)$.

After building the LSTM according to the above three steps, multiple layers of LSTMs can be stacked to create a larger net, in which the output of the former layer is the input of the latter layer. Such an approach can make the model more powerful. In some embodiments, two layers are stacked in the LSTM net. Based on TensorFlow, a LSTM model can be built using the following syntax: net=rnn_cell.BasicLSTMCell(incoming, n_units, activation, inner_activation) Incoming can be a 3-D tensor with shape=[None, timesteps, input_dim], where 'timesteps' is the number of words in the longest log entry, and if this value exceeds 100, it can be set to 100. 'input_dim' is the dimension of vectors after PCA, and it can be set to 100 or 150. 'n_units' is the number of units for LSTM layer, and it can be set to 512. The tan h function can be used as activation and the inner_activation can be the sigmoid function. To make a more powerful model, multiple LSTM layers can be stacked by using the output of the former LSTM layer as the input of the latter LSTM layer. In addition, between each layer a dropout layer can be used by using this syntax: net=tf.nn.dropout(net, prob), where 'net' is the output of LSTM before and 'prob' is the probability of elements maintained in the layer. Here, three LSTM layers are used with two dropout layers (with prob=0.8) to build the LSTM model. If one error is detected as a new error based on the SOFM model, then the LSTM model is used to predict the error category. When an error is predicted, a warning message can be sent to a human support team.

Figure 3D:
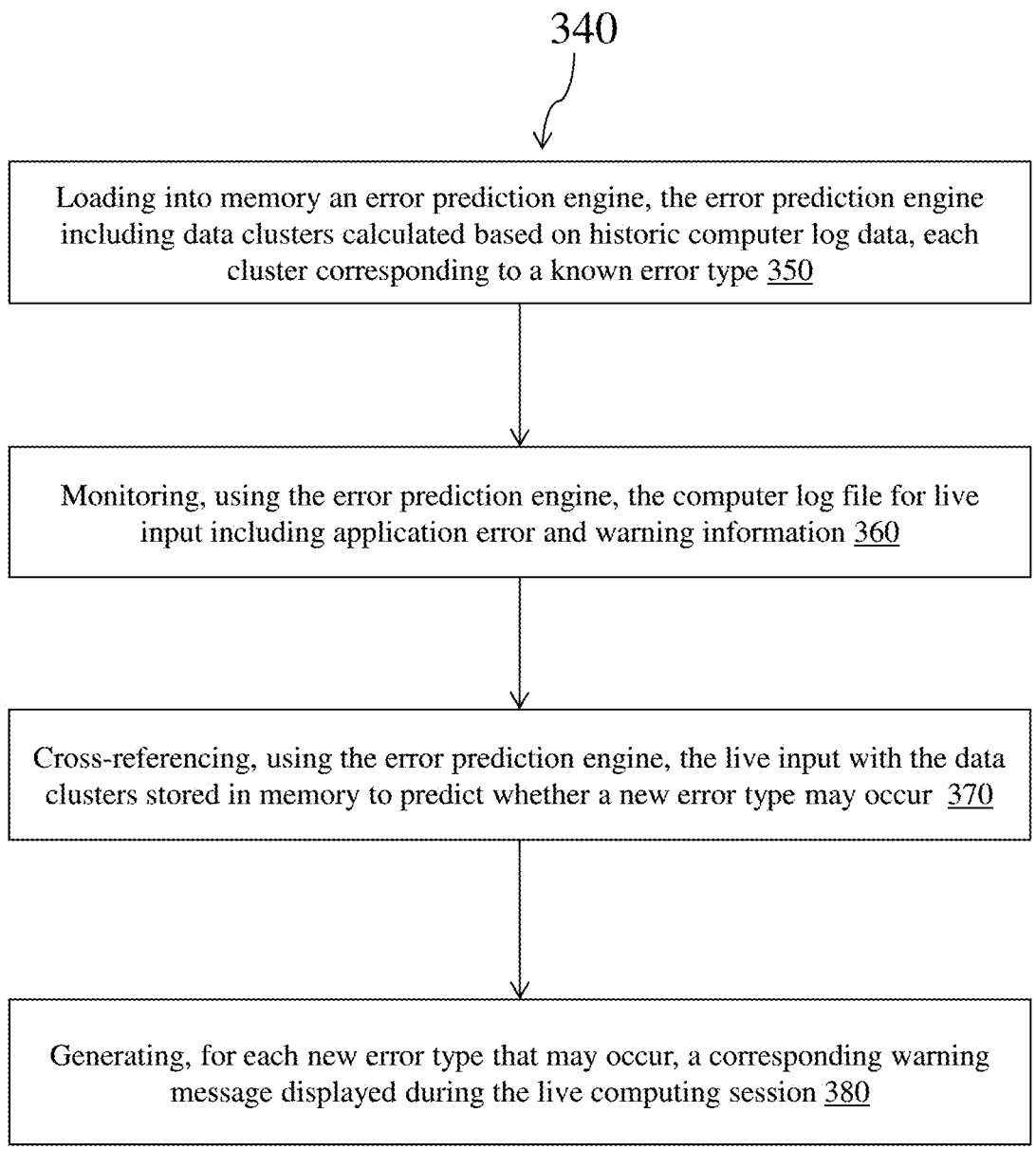
FIG. 3D illustrates a computer-implemented method of identifying one or more application errors in a live computing session using a computer log file, according to an illustrative embodiment of the invention.

Real Time Log Monitoring Module (Monitoring Module) 108. After a prediction model is trained, the model can be used to monitor a real time log and predict if a new error has occurred and what category the error falls into, based on the real time log input and the prediction model. FIG. 3D illustrates one computer-implemented method 340 of identifying one or more application errors in a live computing session using a computer log file, according to an illustrative embodiment of the invention. In a first step 350, an error prediction engine is loaded into memory, the error prediction engine including data clusters calculated based on historic computer log data, each cluster corresponding to a known error type. In a second step 360, the computer log file is monitored for live input, including application error and warning information, using the error prediction engine. In a third step 370, using the error prediction engine, the live input is cross-referenced with the data clusters stored in memory to predict whether a new error type may occur. In a fourth step 380, for each new error type that may occur, a corresponding warning message is generated and/or displayed during the live computing session.

Figure 4A:
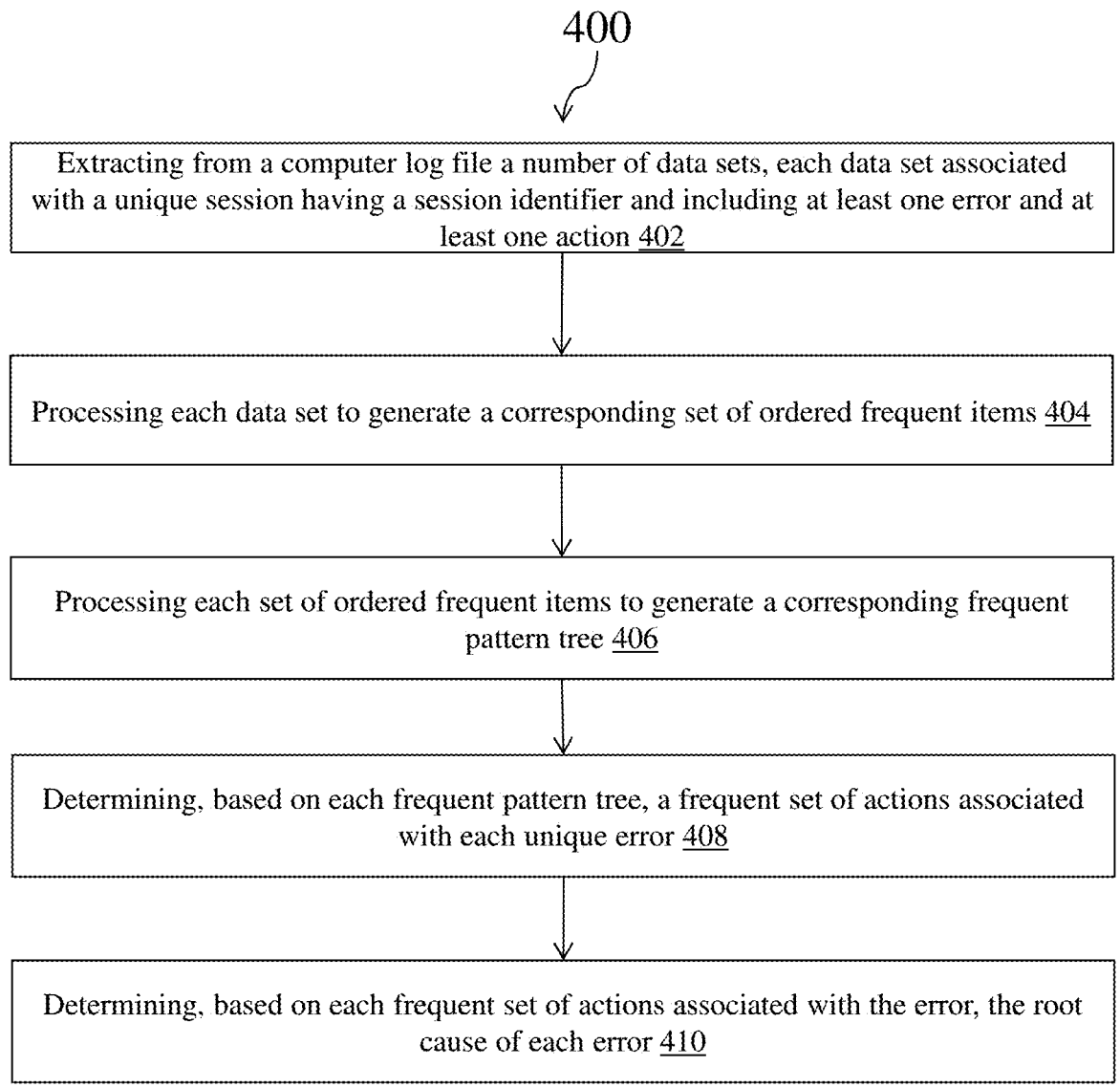
FIG. 4A shows a flowchart of a computer-implemented method for determining the root cause of an error, according to an illustrative embodiment of the invention.

Online Problem Solving Module (Solution Module) 112. When an error is predicted, the system can run the root cause analysis model to identify the root cause of the potential error. And if the solution to fix this issue can be handled by the computer, then a fixing process can be triggered to fix the issue with proper actions, such as call a service or job. If the issue cannot be fixed automatically by the system, the system can prompt a person to become involved. FIG. 4A shows a flowchart of a computer-implemented method 400 for determining the root cause of an error, according to an illustrative embodiment of the invention. In a first step 402, a number of data sets is extracted from the computer log file, each data set associated with a unique session having a session identifier and including at least one error and at least one action. In a second step 404, each data set is processed to generate a corresponding set of ordered frequent items. In a third step 406, each set of ordered frequent items is processed to generate a corresponding frequent pattern tree. Step 406 is achieved by generating, for each unique error, a conditional pattern base of the unique error; and generating, based on each conditional pattern base, a conditional frequent pattern tree for each unique error. In a fourth step 408, a frequent set of actions associated with each unique error is determined based on each frequent pattern tree. In a fifth step 410, the root cause of each error is determining based on each frequent set of actions associated with the error.

As an example, take the following actions and errors ("$a_n$" means the $n^{th}$ action, and "$e_n$" means the $n^{th}$ error). Setting the minimum support threshold to 2, the following is obtained:

| Session | Information | Ordered frequent items |
|---------|-------------|------------------------|
| 001 | a1, a2, a3, e1, a6 | a3, a6, e1, a2 |
| 002 | a4, a6, e1, a8 | a4, a6, e1 |
| 003 | a3, a5, a6, a7, e1 | a3, a6, e1 |
| 004 | a3, a4, e2 | a3, a4, e2 |
| 005 | a2, a3, a4, e2 | a3, a4, e2, a2 |

Figure 4B:
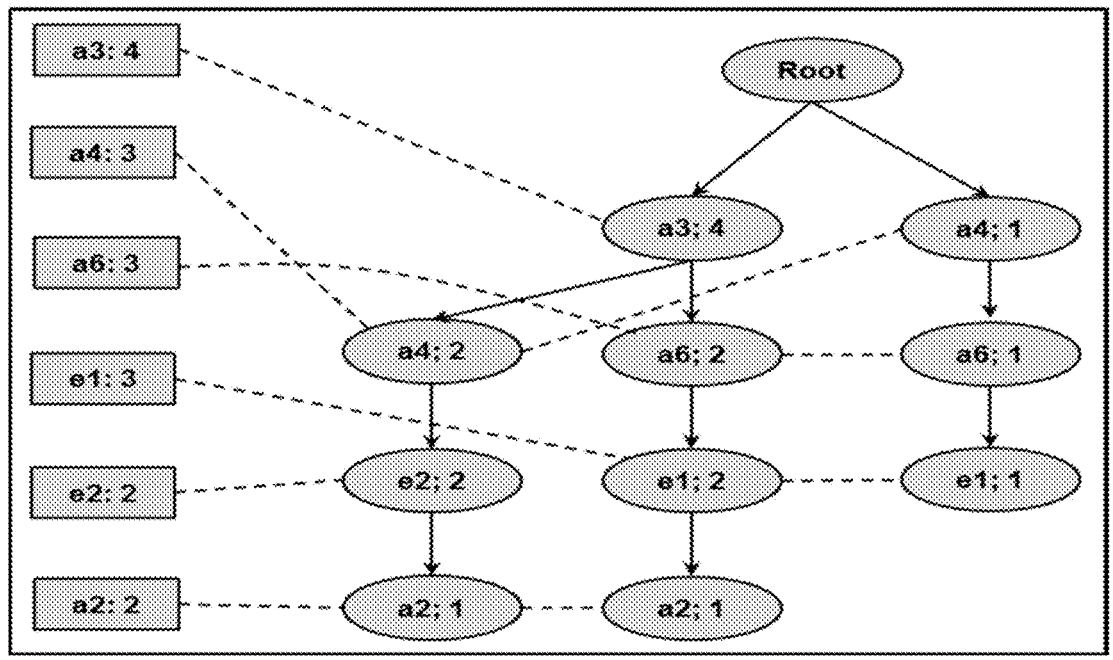
FIGS. 4B-4C illustrate method steps in the computer-implemented frequent-pattern tree analysis used to determine the root cause of an error, according to an illustrative embodiment of the invention.
Figure 4C:
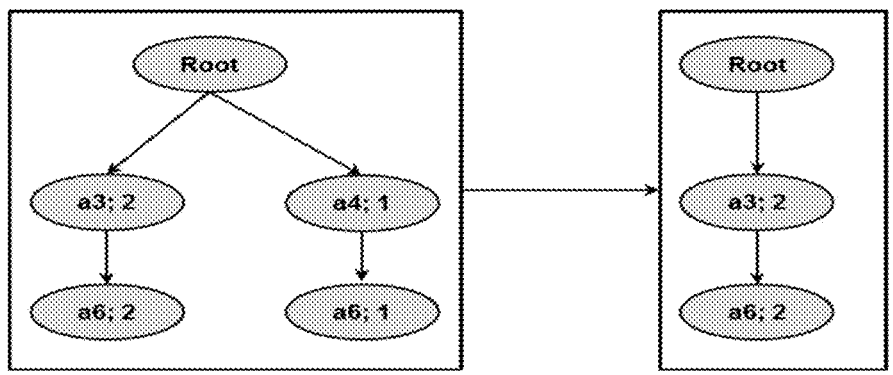

FIGS. 4B-4C illustrate method steps in the computer-implemented frequent-pattern tree analysis used to determine the root cause of an error, according to an illustrative embodiment of the invention. FIG. 4B shows an FP-tree obtained based on the results of ordered frequent items. To start, go through every component in the left column from a3 to a2. Take "e1" for example. Find all "e1" nodes and go through the parents, and two paths are obtained: Path 1: a3: 4, a6: 2, e1: 2; and Path 2: a4: 1, a6: 1, e1: 1. Then, set all the nodes in the path with same count to "e1." Path 1 is a3: 2, a6: 2, e1: 2; and Path 2 is a4: 1, a6: 1, e1: 1. Then, discard "e1" for each path and the Conditional Pattern Base (CPB) of "e1" is obtained: {a3, a6: 2), (a4, a6: 1)}. Finally, build a Conditional FP-Tree of "e1", which is based on this conditional pattern base ("CPB"). The result is shown in FIG. 4C. The threshold set is 2, so the left path is thrown out, and the frequent set is obtained: {(a3: 2, a6: 2)}|e1.

Figure 5A:
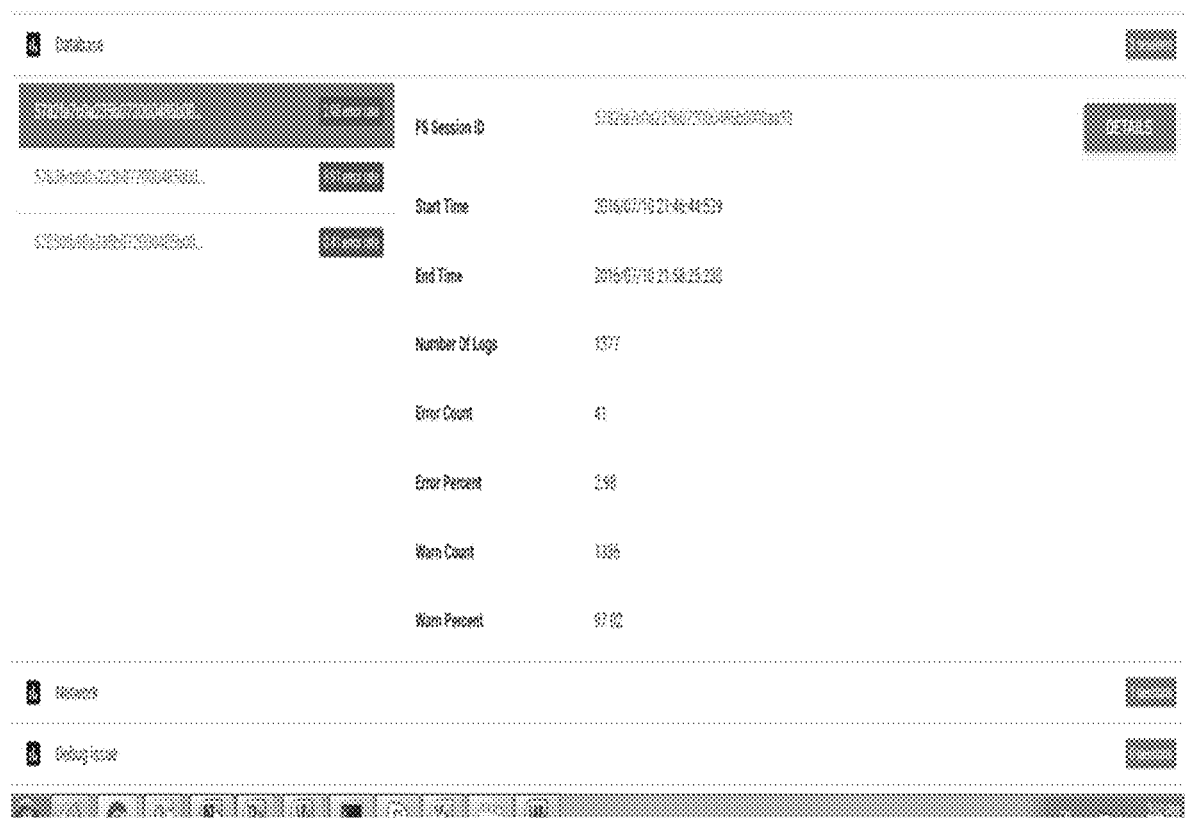
FIG. 5A is a screenshot displaying session information for a session in which new errors have been detected, according to an illustrative embodiment of the invention.

FIG. 5A is a screenshot displaying session information for a session in which new errors have been detected, according to an illustrative embodiment of the invention. This "Session Information Screen" can be configured to display a plurality of statistics, including "FS Session ID", "Start Time", "End Time", "Number of Logs", "Error Count", "Error Percent", "Warn Count", "Warn Percent". These statistics provide high level information of new errors on session level and help determine the context of new errors in the session. They also show how large and complex the log of a certain session is.

Figure 5B:
FIG. 5B is a screenshot displaying a root cause analysis of the session of FIG. 5A after clicking the "DETAILS" button in FIG. 5A, according to an illustrative embodiment of the invention.

FIG. 5B is a screenshot displaying a root cause analysis of the session of FIG. 5A after clicking the "DETAILS" button in FIG. 5A, according to an illustrative embodiment of the invention. As shown, the "Database" screen can be superimposed over the "Session Information Screen" shown and described above in connection with FIG. 5A. The screen in FIG. 5B shows certain elements of the log file highlighted corresponding to what has been identified as the root cause of the error. The highlighted part shows the key component function of the application, which can be customized according to what the users care about most.

TABLE 1

EXPERIMENTAL RESULTS

| Training | Testing | With Warning | Size of Dictionary | Pooling | Num. of Cluster | Iteration | True Positive | Predict Positive | Precision | Recall |
|----------|---------|--------------|--------------------|---------| ----------------|-----------|---------------|------------------|-----------|--------|
| 2.1 GB | 1.9 GB | No | 552 | Max Pooling | 20 | 3000 | 9 | 14 | 64.3% | 66.7% |
| | | No | 552 | Pooling | 16 | 3000 | 6 | 9 | 66.7% | 40.0% |
| | | No | 552 | | 16 | 800 | 12 | 14 | 85.7% | 53.3% |
| | | Yes | 8289 | | 16 | 3000 | 8 | 14 | 57.1% | 53.3% |
| | | Yes | 8289 | | 16 | 800 | 14 | 16 | 87.5% | 53.3% |
| | | Yes | 8289 | | 20 | 800 | 17 | 20 | 85.0% | 53.3% |
| | | Yes | 8289 | | 30 | 800 | 17 | 21 | 81.0% | 80.0% |

As illustrated in Table 1, about 2.1 GB of the log file can be used for training and 1.9 GB used for testing. The third column of Table 1 concerns whether or not context information from warnings has been added into the dictionary. The column "True Positive" refers to the number of truly new error types detected in the experiments, and the column "Predict Positive" refers to the new error types predicted in the experiments. From these figures, the "Precision" can be easily obtained. Finally, the last column. "Recall," shows how many kinds of new error types can be detected through the system.

The results in the table show that adding the context information from warnings actually improves performance, supporting the idea that the information contained in warnings is critical for log analysis. Generally, it is difficult to make the decision of which words are important and should be preserved based only on errors when training the dictionary. For example, when there is a word that only occurs in one type of error, then this word is representative of this type of error. But this can be discarded as it is seen as noise for its low frequency. Adding warning information can adjust the weight of words, so that a more powerful dictionary can be obtained to represent the log file.

In some embodiments, more iteration times of self-organizing map (SOM) will not lead to improvement in performance. That is because high iteration times can cause overfitting. In some embodiments, a greater number of iterations can result in a more stable SOM model for training data, but to testing data, this model may not suitable because it overreacts to minor fluctuations in the training data. This causes the drop of performance in the testing stage in machine learning. That is why "800" has better performance than "3,000". Experiments suggest that the present systems and methods can not only minimize the time spent on log understanding, but also can do many more things that humans using Splunk (the next-best available alternative according to today's technology) cannot do.

Figure 6A:
FIG. 6A shows a screenshot of the results of a query performed in Splunk that returns no errors, according to an illustrative embodiment of the invention.
Figure 6B:
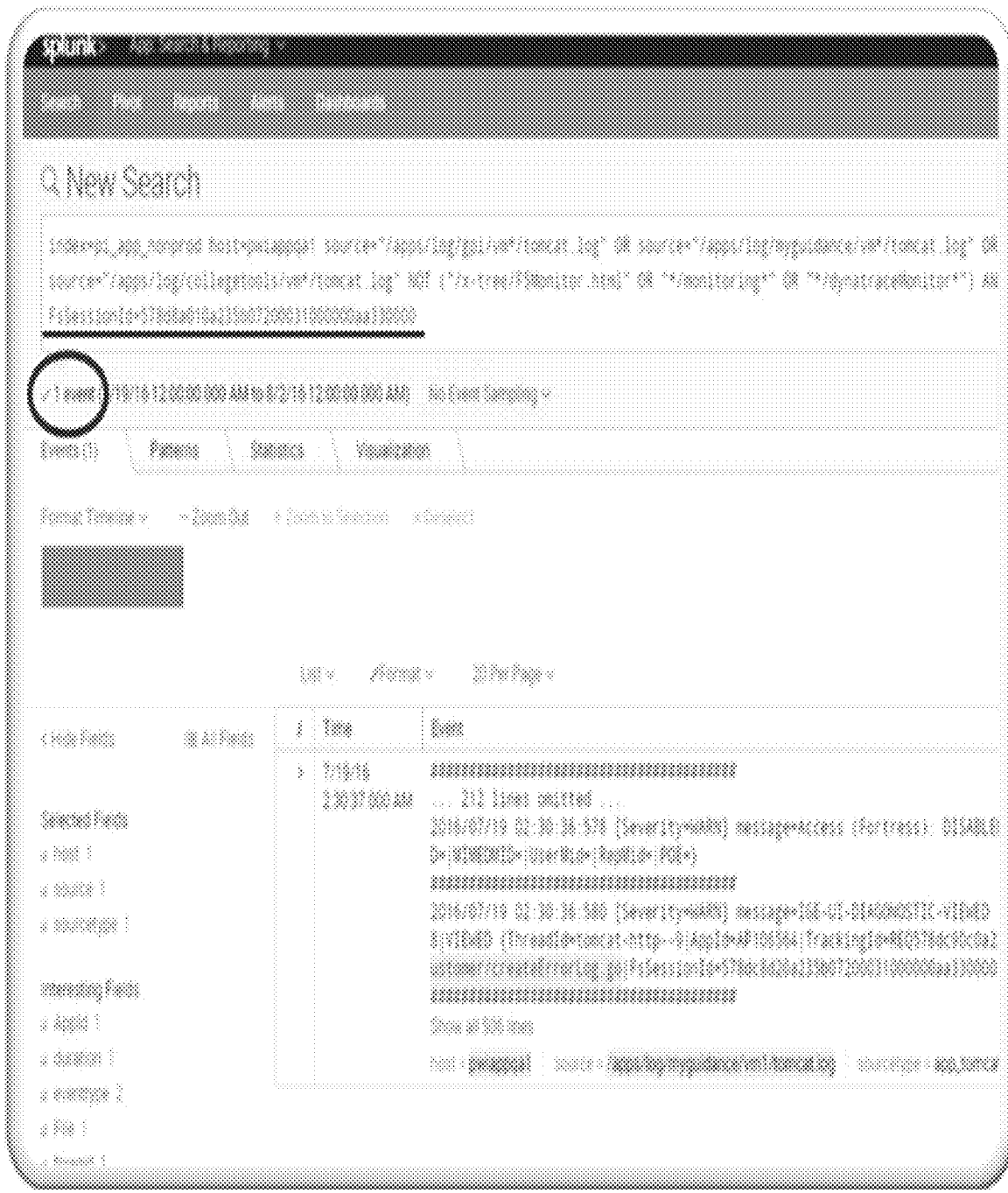
FIG. 6B shows a screenshot showing raw log data that reveals the error not shown in FIG. 6A, according to an illustrative embodiment of the invention.

FIG. 6A shows a screenshot of the results of a query performed in Splunk that returns no errors. The new error's session Id, shown in underlining, is a new error found by the present system, but when the same is checked in Splunk, Splunk reports "No results found," as shown in FIG. 6A. However, FIG. 6B shows a screenshot showing raw log data that reveals the error not shown in FIG. 6A. An analysis of the raw log data reveals that this session file is actually contained in the raw log data, as underlined and circled in FIG. 6B.

Figure 6C:
FIG. 6C shows two Splunk reports side-by-side to illustrate the problem of "mixing" overcome according to one illustrative embodiment of the invention.

FIG. 6C shows two Splunk reports side-by-side to illustrate the problem of "mixing," which is overcome according to one illustrative embodiment of the invention. The new error's Session Id, shown in underlining, is found by the present system. But, Splunk reports an extra "subjectarea" (corresponding to the error category written by the developer): "dentitycompletinfo", which is not reported by the present system. When compared against the raw log data, this subjectarea belongs to another Session Id. So, a human may be misled.

Figure 6D:
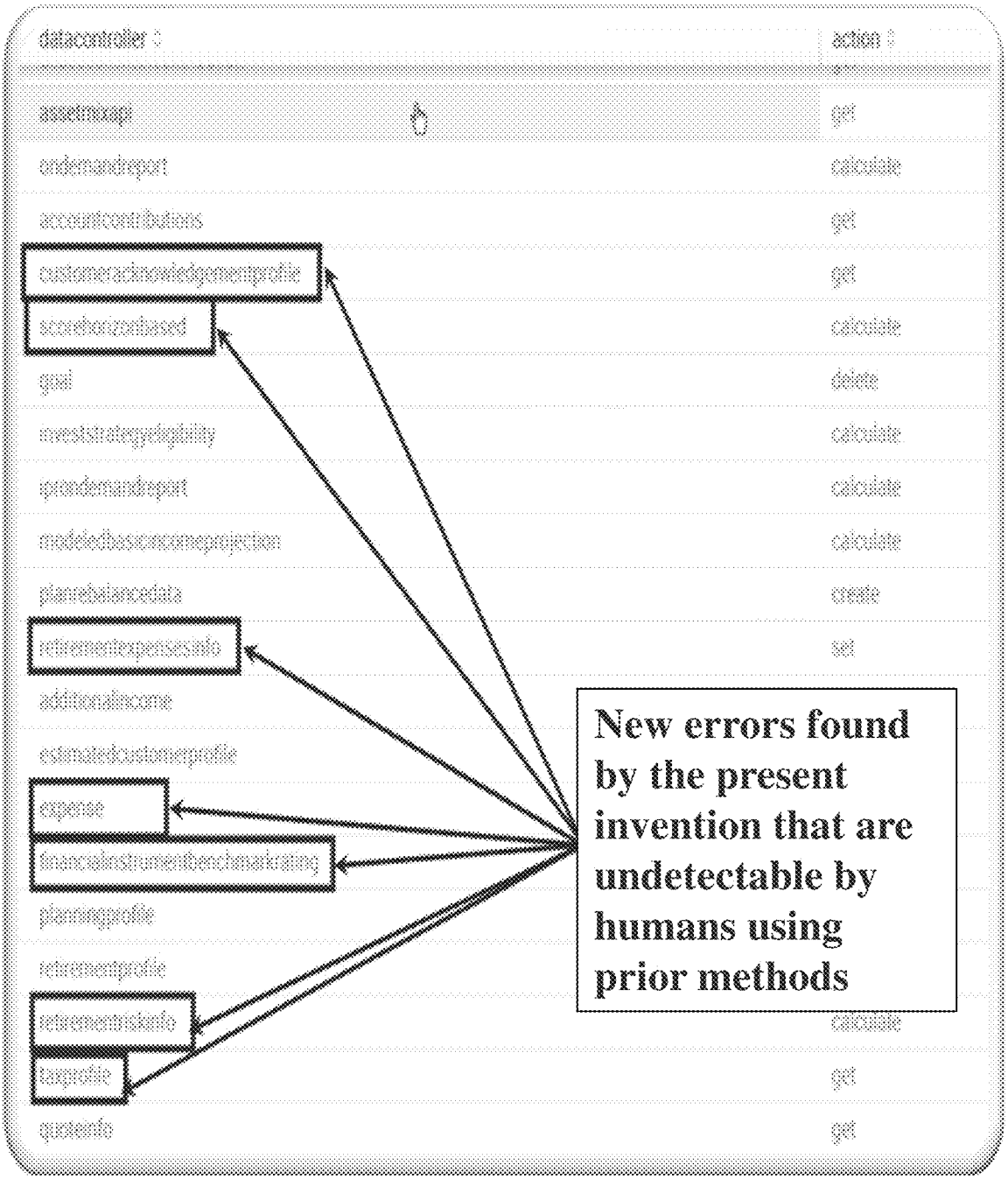
FIG. 6D shows a screenshot of all uncovered errors sorted by frequency, with new errors found by the present invention boxed, according to an illustrative embodiment of the invention.

FIG. 6D shows a screenshot of all uncovered errors sorted by frequency, with new errors found by the present invention circled with a box, according to an illustrative embodiment of the invention. FIG. 6D shows a screenshot of all the errors sorted by frequency, and the errors in boxes are part of new errors found by the present invention. These errors cannot be found by a human because their frequency is not in the top range. As demonstrated above, the current system can easily capture most of the new errors, and in fact obtains a recall rate of 86.7%. Humans typically check only a few of the most common errors reported by Splunk, due to limited time available, but these few most common errors are not the new errors we want to find.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computer-implemented method of training, using a raw computer log file, an application error prediction engine to identify one or more new application error types, the method comprising:
    parsing the raw computer log file into a plurality of unstructured data sets, each unstructured data set associated with a unique computing session having a session identifier and ending in an application error;
    extracting, from each unstructured data set, values for a specified set of parameters in each unstructured data set;
    encoding the extracted values for each unstructured data set into a corresponding Y×Z matrix representing a computing session having Y actions, each action including Z features, the Y×Z matrix including numerical entries representing the extracted values, wherein Y and Z are each greater than one;
    generating, for each Y×Z matrix, a corresponding Z-dimensional vector using a statistical pooling method to represent higher level statistical information associated with each unique computing session, the corresponding vectors collectively forming an Z×W matrix, wherein Z and W are each greater than one;
    calculating, based on the Z×W matrix, using an artificial neural network, a set of clusters, each cluster corresponding to a known error type; and
    integrating the set of clusters into the application error prediction engine to create a model used to identify new error types that are different from each of the known error types corresponding to the calculated clusters.

2. The method of claim 1 wherein the statistical pooling method includes one of mean-pooling, max-pooling or stochastic-pooling.

3. The method of claim 1 wherein generating the corresponding vectors further includes using a principal component analysis method.

4. The method of claim 1 wherein the artificial neural network is a self-organizing feature map.

5. The method of claim 1 wherein the specified set of parameters corresponds to a set of features from individual log entries in the computer log file.

6. The method of claim 5 wherein the set of features includes a session identifier, a severity, a message, a request URI or a POE value of the computer log file.

7. The method of claim 1 further including encoding each of the extracted features in the Z-dimensional vector as a number.

8. The method of claim 7 further including normalizing the Z-dimensional vector.

9. The method of claim 1 wherein the Y×Z matrix includes information encoding at least one warning message and at least one error message.

10. The method of claim 1 wherein the Y×Z matrix includes context information from the computer log file related to a warning message.

11. The method of claim 1 wherein a quantity of clusters calculated corresponds to a quantity of unique error types.

12. The method of claim 1 further comprising determining a new error type that is different from each of the unique error types corresponding to the calculated clusters.

13. The method of claim 12 further including determining a category of the new error type.

14. The method of claim 13 wherein determining the category of the new error type includes training a long short-term memory model.

15. The method of claim 14 wherein determining the category of the new error type includes stacking multiple layers of long short-term memory models, an input of a second layer provided by an output of a first layer, and an input of a subsequent layer provided by an output of an immediately preceding layer.

16. The method of claim 1 further comprising determining a root cause of the new error type using a frequent pattern tree algorithm.

17. The method of claim 16 further comprising predicting an occurrence of a future error.

18. The method of claim 17 further including taking a preemptive or remedial action to address the future error.

19. A computer-implemented method of identifying one or more new application error types in a live computing session using a raw computer log file, the method comprising:
loading into memory an error prediction engine, the error prediction engine including data clusters calculated based on historic computer log data using an artificial neural network, each cluster corresponding to a known error type;
monitoring, using the error prediction engine, the raw computer log file for live input including application error and warning information;
cross-referencing, using the error prediction engine, the live input with the data clusters stored in memory to predict whether a new application error type may occur; and
generating, for each new error type that may occur, a corresponding warning message displayed during the live computing session,
wherein the error prediction engine is built using a statistical pooling method to represent higher level statistical information associated with each unique computing session, the statistical pooling method generating a Z×W matrix of numerical entries representing W sessions, the W sessions each represented by a Z-dimensional vector reflecting a combination of Y actions in each session, each action including Z features, wherein Y, Z and W are each greater than one.

20. The method of claim 19 further comprising determining a category of the new error type.

21. The method of claim 20 wherein determining the category of the new error type includes using a long short-term memory model.

22. The method of claim 19 further comprising determining a root cause of the new error type using a frequent pattern tree algorithm.

23. A computer-implemented method of determining, based on a raw computer log file, a root cause of at least one new application error, the method comprising:
extracting from the raw computer log file a number of unstructured data sets, each unstructured data set associated with a unique session having a session identifier and including at least one error and at least two actions, each action including at least two features;
processing each data set to generate a corresponding set of ordered frequent items;
processing each set of ordered frequent items to generate a corresponding frequent pattern tree by:
generating, for each unique new application error that is different from each known error type, a conditional pattern base of the unique error; and
generating, based on each conditional pattern base, a conditional frequent pattern tree for each unique new application error;
determining, based on each frequent pattern tree, a frequent set of actions associated with each unique new application error; and
determining, based on each frequent set of actions associated with the error, the root cause of each new application error,
wherein the at least one new application error is predicted using a statistical pooling method to represent higher level statistical information associated with each unique computing session, the statistical pooling method that generating a Z×W matrix of numerical entries representing W sessions, the W sessions each represented by a Z-dimensional vector reflecting a combination of Y actions in each session, each action including Z features, wherein Y, Z and W are each greater than one.

24. The method of claim 23 including identifying a solution associated with at least one error.

25. The method of claim 24 including implementing the solution automatically or triggering a fixing process to implement the solution.

26. A computer-implemented method of training an error prediction model based on historic raw computer log data, the method comprising:
processing the historic raw computer log data to generate unstructured data subsets, each unstructured data subset corresponding to a unique session having a first number of actions, each action having a second number of features;

for each session ending in an error:
   extracting from each action a set of features;
   processing each set of features into a set of corresponding numerical components;
   generating, for each set of numerical components, a normalized vector; and
   grouping the normalized vectors into a Y×Z session matrix, wherein Y and Z are each greater than one;
applying to each session matrix a statistical pooling method to represent higher level statistical information associated with each unique computing session, thereby generating a corresponding set of at least two Z-dimensional session vectors; and
calculating, based on the set of session vectors, using an artificial neural network, a set of clusters, each cluster corresponding to a unique known error type, the set of clusters used to identify new error types that are different from each of the unique known error types corresponding to the calculated clusters.

27. The method of claim 26 further comprising:
defining a labeling function configured to generate an output for each session ending in a new error type;
training, using the labeling function, a long short-term memory architecture comprising a net of long short-term memory layers, wherein an output of one layer includes an input of a subsequent layer; and
determining a category of the new error type based on a scope of the output of the labeling function.

\* \* \* \* \*